UNITED STATES PATENT OFFICE.

CHARLES B. JACOBS, OF EAST ORANGE, NEW JERSEY, ASSIGNOR, BY MESNE ASSIGNMENTS, TO THE UNITED BARIUM COMPANY, OF JERSEY CITY, NEW JERSEY, A CORPORATION OF NEW JERSEY.

PROCESS OF PRODUCING CAUSTIC SODA AND BARIUM SULFATE.

SPECIFICATION forming part of Letters Patent No. 737,740, dated September 1, 1903.

Application filed March 2, 1901. Serial No. 49,641. (No specimens.)

*To all whom it may concern:*

Be it known that I, CHARLES B. JACOBS, a citizen of the United States, residing at East Orange, in the county of Essex and State of New Jersey, have invented certain new and useful Improvements in Processes of Manufacturing Caustic Soda and other Products, of which the following is a specification.

This invention relates to improvements in processes for the production of caustic soda and other products.

The main feature of my invention is the utilization of sodium sulfate and barium hydrate to form by double decomposition barium sulfate and sodium hydrate; but with this reaction as a basis I may associate other preliminary and subsequent reactions to produce other products. Thus to produce the sodium sulfate for this reaction I may start with sodium chlorid, decomposing the same with sulfur dioxid, steam, and oxygen and producing sodium sulfate and hydrochloric acid, and to produce the barium hydrate required for the reaction I may, according to my Patent No. 624,041, dated May 2, 1899, use natural barium sulfate, which, treated with carbon in the electric furnace, gives barium oxid and sulfid and sulfur dioxid. The latter product may be used in the production of the sodium sulfate from sodium chlorid, as above stated, and the barium oxid and sulfid may be treated with water to produce barium hydrate. It will be noted that while a form of barium sulfid is here used as a basis or source of the barium element and while one resultant product of the final reaction is also barium sulfate the latter product is in a very different and much more valuable state than the original natural sulfate, the precipitated sulfate being more finely divided and purer than is possible with the natural article and being, in fact, salable commercially as blanc fixe or artificial barium sulfate at a much higher price than the natural article; but if it be desired to produce only hydrochloric acid and caustic soda then the barium sulfate resulting from the main reaction may be used over again for the production of an additional quantity of barium oxid and sulfur dioxid, so that a limited quantity of barium sulfate may be used for the preparation of an indefinite quantity of such products.

Considering the process as a means of producing caustic soda and barium sulfate it is carried out as follows: Solutions of barium hydrate and of sodium sulfate in molecular equivalent proportions containing, respectively, for example, one hundred and seventy-one pounds of barium hydrate and one hundred and forty-two pounds of sodium sulfate are mixed and the following reaction takes place:

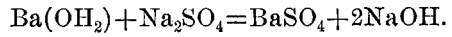
$$Ba(OH_2) + Na_2SO_4 = BaSO_4 + 2NaOH.$$

The sodium hydrate or caustic soda is filtered from the precipitate of barium sulfate and evaporated to dryness and then fused and packed for use. The barium sulfate is washed free from sodium hydrate with hot water, and if it is to be sold as blanc fixe or pigment it is either packed in the form of paste for use in card and paper sizing or it is dried for mixing with oil for use as a paint.

The sodium sulfate and barium hydrate for use in this process may be the ordinary commercial products so named; but I prefer to produce the same from the cheaper naturally-occurring common salt and barytes. The complete process so carried out would be as follows: Barium sulfate is heated with carbon in the electric furnace according to my Patent No. 624,041, dated May 2, 1899, the reaction being as follows:

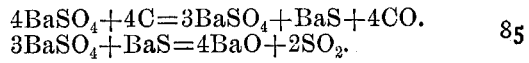
$$4BaSO_4 + 4C = 3BaSO_4 + BaS + 4CO.$$
$$3BaSO_4 + BaS = 4BaO + 2SO_2.$$

As stated in said patent, the second reaction does not in general keep pace with the first, so that in the final product or residue sulfid is formed as well as the oxid. By treating the resulting mass or residue with water, however, a portion of the sulfid is converted into hydrate as follows:

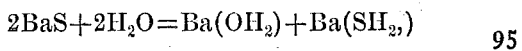
$$2BaS + 2H_2O = Ba(OH_2) + Ba(SH_2,)$$

the oxid of course also passing into hydrate. The $SO_2$ from the electric furnace is led into a heated chamber or vessel containing sodium chlorid, water or steam and oxygen also being supplied and the following reaction taking place:

$$2NaCl + SO_2 + H_2O + O = Na_2SO_4 + 2HCl.$$

The hydrochloric acid passes off and is condensed and absorbed with water and utilized in the usual manner. The sodium sulfate and the barium hydrate from the electric-furnace reaction are utilized in the formation of barium sulfate and caustic soda, as above described. It will be seen that this barium sulfate may be used in the regeneration of new portions of barium hydrate and sodium sulfate.

Having thus described my invention, the following is what I claim as new therein and desire to secure by Letters Patent:

The process of producing caustic soda and artificial barium sulfate from native sodium and barium compounds, which consists in subjecting native barium sulfate in the presence of carbon to heat sufficient to reduce the same to barium oxid, barium sulfid and sulfur dioxid; treating the barium oxid and barium sulfid with water to produce barium hydrate, treating sodium chlorid with the sulfur dioxid in the presence of water and oxygen to produce sulfate, then treating the barium hydrate with the sodium sulfate to produce caustic soda and barium sulfate.

CHARLES B. JACOBS.

Witnesses:
ARTHUR P. KNIGHT,
J. GREEN.